(12) United States Patent
Lacreu

(10) Patent No.: US 8,152,190 B2
(45) Date of Patent: Apr. 10, 2012

(54) QUICK RELEASE STEM

(76) Inventor: Alejandro Lacreu, New York, NY (US)

( * ) Notice: Subject to any disclaimer, the term of this patent is extended or adjusted under 35 U.S.C. 154(b) by 170 days.

(21) Appl. No.: 12/704,370

(22) Filed: Feb. 11, 2010

(65) Prior Publication Data
US 2010/0132502 A1    Jun. 3, 2010

Related U.S. Application Data

(63) Continuation-in-part of application No. 11/866,544, filed on Oct. 3, 2007, now Pat. No. 7,740,264.

(51) Int. Cl.
*B62K 21/22* (2006.01)
(52) U.S. Cl. ................ 280/279; 74/551.1; 74/551.3
(58) Field of Classification Search ............ 280/279, 280/280, 272, 276, 278, 287; 74/551.1, 551.2, 74/551.3
See application file for complete search history.

(56) References Cited

U.S. PATENT DOCUMENTS

| | | | |
|---|---|---|---|
| 5,197,349 A | | 3/1993 | Herman |
| 5,327,798 A | * | 7/1994 | Lerch, Jr. .................... 74/551.3 |
| 5,419,573 A | * | 5/1995 | Kao ............................. 280/278 |
| 5,562,013 A | * | 10/1996 | Kao ............................. 74/551.3 |
| 6,637,288 B2 | * | 10/2003 | Chu ............................ 74/551.3 |
| 7,243,573 B2 | * | 7/2007 | Bass et al. ................... 74/551.1 |
| 2006/0076752 A1 | | 4/2006 | Montague et al. |

* cited by examiner

*Primary Examiner* — Tony Winner
(74) *Attorney, Agent, or Firm* — Amster, Rothstein & Ebenstein, LLP

(57) ABSTRACT

A stem connecting the handlebars and steerable fork of a cycle has one tube attached to the handlebars and another tube attached to the steerable fork with the tubes capable of being rotated and locked with respect to one another. This arrangement allows for various configurations of the handlebars and fork including the typical riding configuration as well as an alternate configuration where the handlebars are folded with respect to the fork. Change in configuration is accomplished without tools by way of a biased locking arrangement for the tubes.

11 Claims, 14 Drawing Sheets

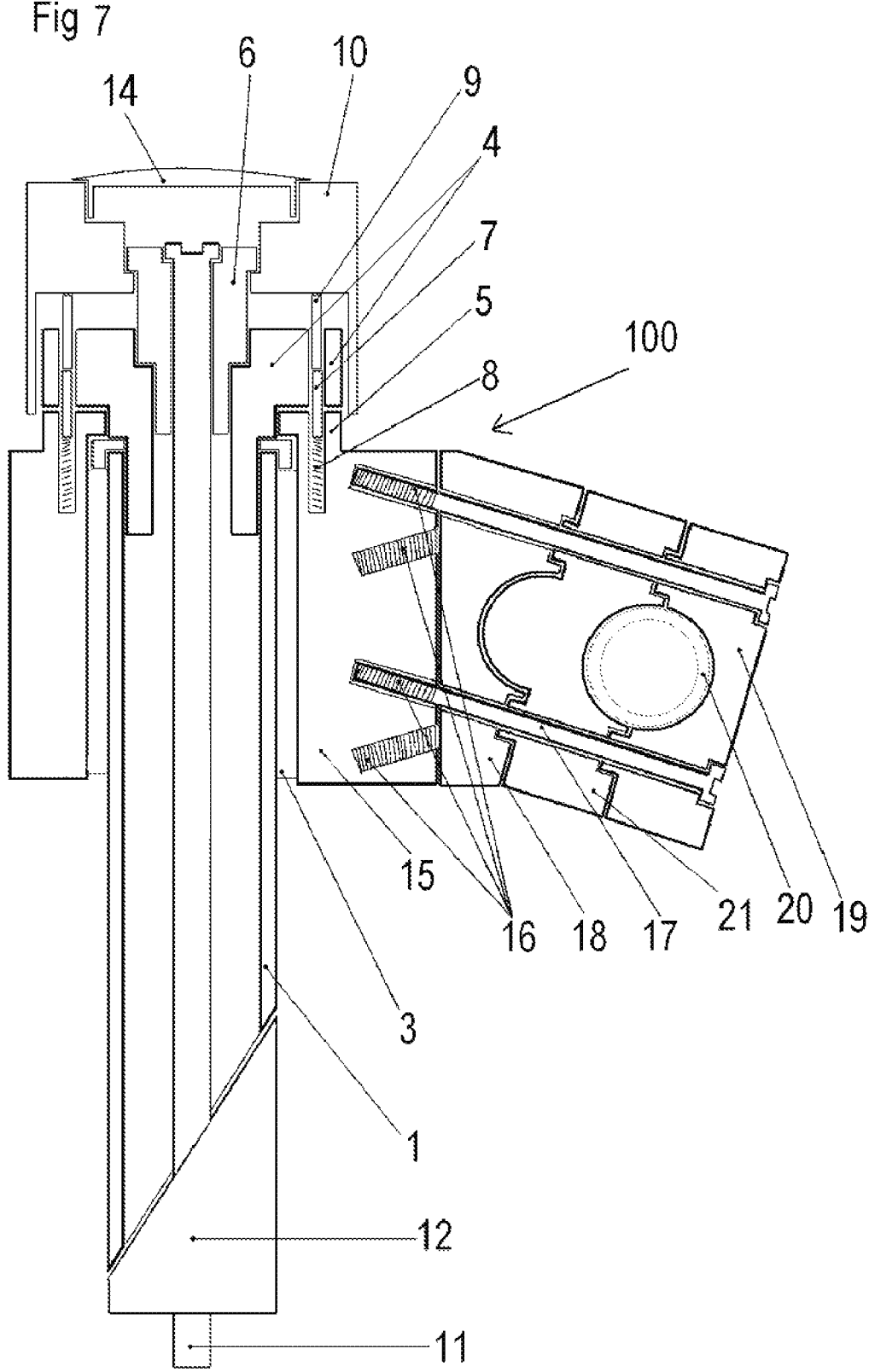

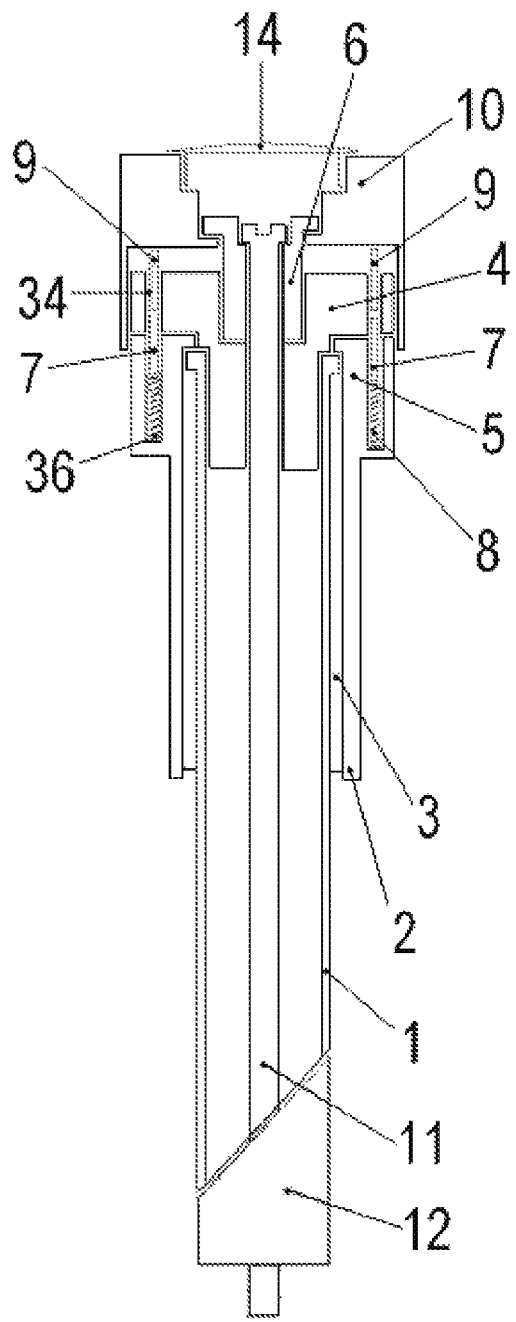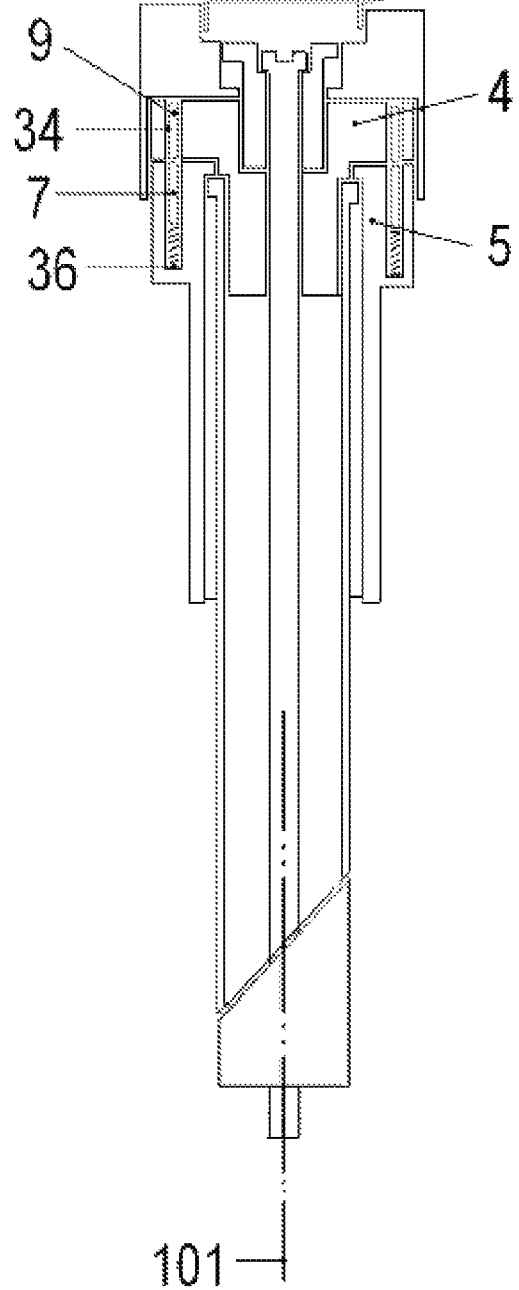

QUICK RELEASE STEM

CROSS-REFERENCE TO RELATED APPLICATIONS

This application is a continuation-in-part of U.S. patent application Ser. No. 11/866,544, filed Oct. 3, 2007, now U.S. Pat. No. 7,740,264, the contents of which is hereby incorporated by reference.

BACKGROUND

The stem of a cycle, e.g. a bicycle, connects the handlebar with the steerable front wheel through the fork; the fork holding the front wheel. The quill is the vertical portion of the stem. In many designs the quill and the stem are unitary. The stem and the quill are critical parts on a bicycle because all forces the rider's arms make while pedaling go through the stem and the quill to the frame, and if either of them breaks there is no way to hold the bicycle with the hands and the rider will consequently end up on the ground. Stems are often adjustable in different ways: Some or all of the height, the angle to a vertical plane, and the angle on a horizontal plane, may be adjustable in different combinations.

The setting for the long axis of the handlebar when the bicycle is being ridden is perpendicular to the plane of the front wheel. However, at the time of storing or transporting a bike on an elevator or a train, that setting may become inconvenient. Although this angle is usually adjustable, it requires a tool and takes significant time to adjust to and from the riding setting. In addition, the parts for accomplishing this adjustment are not designed to be used very often, e.g. any time it is desired to turn the handlebars parallel to the plane of the front wheel for storage or travel.

Foldable bicycles usually have foldable stems or quills while non-foldable bicycles typically come with handlebars that, at best, are only foldable with special tools and knowledge as well as substantial time and effort. Examples of patents disclosing foldable handlebars include U.S. Pat. Nos. 5,269,550; 5,419,573; 6,637,288 and 7,243,573.

SUMMARY OF THE INVENTION

According to an example embodiment of the present invention, a cycle stem includes handlebars attached to a top thereof, a fork attached to a bottom thereof and an adjustable quill. The adjustable quill comprises: an inside tube having an inside tube axis and an inside tube disc, the inside tube disc having formed therein an aperture radially spaced from the inside tube axis; an outside tube having an outside tube axis and an outside tube disc, the outside tube disc having formed therein an aperture radially spaced from the outside tube axis; and a locking element selectively disposed in one of an unlocked position and a locked position, the unlocked position characterized in that the locking element is disposed in only one of the outside tube aperture or the inside tube aperture and the locked position characterized in that the locking element is disposed in both the outside tube aperture and the inside tube aperture.

In at least one embodiment, a biasing element may be provided, exerting a force toward the locked position of the locking element. This force may be overcome with a button on one of either the inside tube or the outside tube, thus moving the unit toward the unlocked position of the locking element.

In at least one embodiment, the locking element may be in the form of locking pins, each locking pin disposed adjacent a spring urging the locking pin into the locked position. Pushing pins may also be provided, disposed in the other of the inside tube aperture or the outside tube aperture and arranged to exert a force on the locking pins to overcome the urging force and push the locking pins into the unlocked position.

In at least one embodiment, the cycle stem includes a bearing element radially disposed between the outside tube and the inside tube. The bearing element may be any one of a low friction sleeve, a plurality of ball bearings or at least one needle bearing.

According to an example embodiment of the present invention, an adjustable quill comprises: a first tube attached to a handlebar of the cycle; a second tube attached to a wheel fork of the cycle; and locking means for selectively locking and unlocking the first tube and the second tube in rotational relationship with one another. The locking means may include a biasing element exerting a force toward a locked position of the locking element; and a button on one of either the inside tube or the outside tube, the button adapted to have an external force exerted thereon capable of overcoming a biasing force from the biasing element toward an unlocked position of the locking element. This locking means may also include a first tube disc having first tube disc apertures therein; a second tube disc having second tube disc apertures therein; and at least one locking element disposed, in an unlocked position, only in the first tube disc apertures and, in a locked position, in both the first and second tube disc apertures.

In at least one embodiment, the locking element includes locking pins, each locking pin disposed adjacent a spring urging the locking pin into the locked position. The locking element may further have pushing pins disposed in the second tube aperture capable of exerting a force on the locking pins to overcome the spring urging force and push the locking pins into the unlocked position. In another example embodiment of the present invention, the locking element has locking tabs of complementary shape to first and second tube disc apertures.

According to an example embodiment of the present invention, a cycle stem comprises: a quill having first end including an attachment for connecting to a wheel fork of a cycle and a second end defining an inside tube and a stem having a body, a first end including an attachment for connecting to a handlebar of a cycle, a second end including an hole in which an inner surface of the hole defines an outside tube coaxially disposed about the inside tube for rotation therebetween. The quill includes one or more radially oriented apertures disposed around the inside tube at the second end of the quill. The stem including one or more radially oriented cavities disposed on the inner surface of the outside tube corresponding to the one or more apertures of the quill. One or more locking elements are disposed in at least one of an unlocked and a locked position, the locked position characterized in that each of the locking elements are disposed at least partially within an aperture of the quill and a cavity of the stem so as to lock the stem to the quill to prevent relative rotation therebetween, the unlocked position characterized in that each of the locking elements are disposed in one of an aperture of the quill and a cavity of the stem to allow the stem to rotate in a free swivel condition with respect to the quill. A cam is slidably disposed within the inside tube at the second end of the quill, the cam having a first position characterized in that that the cam forces the locking elements to move radially into the locked position and a second position characterized in that the cam allows the locking elements to move radially to the unlocked position.

In at least one embodiment, the locking elements move between the locked position and the unlocked position when the apertures of the quill are aligned with the cavities of the stem.

In at least one embodiment, the cycle stem further comprises a biasing element applying a biasing force on the cam locking toward the first position, thereby biasing the locking elements toward the locked position.

In at least one embodiment, the cam moves toward the second position when a force is applied to the cam to overcome the biasing force of the biasing element, thereby allowing the locking elements to move to the unlocked position.

In at least one embodiment, the cam pushes the locking elements radially outward toward the locked position when the cam is in the first position and the cam allows the locking elements to move radially inward toward the unlocked position when the cam moves toward the second position.

In at least one embodiment, the locking elements are located at positions corresponding to one or more locking positions for the handlebar of the cycle.

In at least one embodiment, four locking elements are located at positions spaced apart by about 90° increments.

In at least one embodiment, the cam has a lower section having a greater outer diameter than an upper section of the cam.

In at least one embodiment, the cycle stem further comprises a secondary lock that is lockable to maintain the stem in free swivel condition with respect to the quill.

In at least one embodiment, the secondary lock comprises a locking cam disposed with the body of the stem which is rotatable to obstruct a locking element from entering the cavity in the stem.

In at least one embodiment, the obstructed locking element protrudes radially inward so as to prevent the cam from returning to the first position.

BRIEF DESCRIPTION OF THE DRAWINGS

FIG. 1a is a cross sectional plan view of a portion of the stem in a locked arrangement according to an example embodiment of the present invention;

FIG. 1b is a cross sectional plan view of the stem of FIG. 1a in an unlocked arrangement;

FIG. 1c is a cross sectional plan view taken along section line 1c of FIG. 1a;

FIG. 1d is a cross sectional plan view taken along section line 1d of FIG. 1b;

FIG. 7 is a cross sectional plan view of the stem according to another example embodiment of the present invention;

FIG. 8a is a cross sectional plan view of the stem in a locked arrangement according to another example embodiment of the present invention;

FIG. 8b is a cross sectional plan view of the stem of FIG. 8a in an unlocked arrangement;

FIG. 13d cross sectional plan view taken along line 13d of FIG. 13a

DETAILED DESCRIPTION OF THE EXEMPLARY EMBODIMENTS

Figure 12:
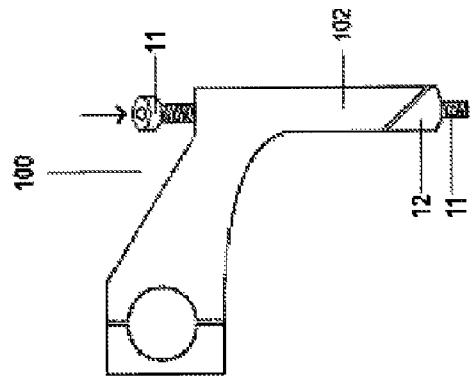
FIG. 12 is a side plan view of a bicycle stem.
Figure 11:
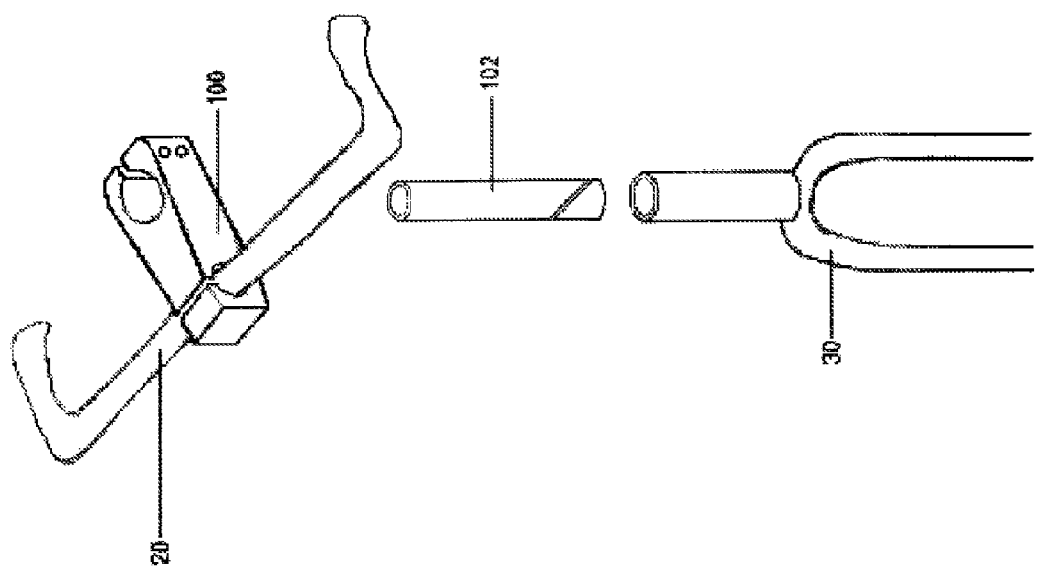
FIG. 11 is an exploded perspective view of a cycle steering mechanism showing the context of the present invention.

FIGS. 11 and 12 show the quill 102 of the present invention and its relationship to the handlebars 20, stem 100 and fork 30 of a typical bicycle. Anchoring bolt 11 is also shown due to its importance in attaching the quill 102 to the fork 30.

FIG. 1a is a cross section of the quill 102 of one possible embodiment of the present invention, showing the quill 102 having an inside tube 1 locked with respect to an outside tube 2. Because the inside tube 1 is attached to the fork 30 and the outside tube 2 is attached to the handlebar 20, locking the inside tube 1 and the outside tube 2 with respect to one another locks the handlebar 20, fork 30 and front wheel 32 in a particular arrangement. One advantageous arrangement of the handlebar 20 and fork 30 is where the handlebar 20 is perpendicular to the plane of the front wheel 32. Another advantageous arrangement of the handlebar 20 and fork is where the handlebar 20 is parallel to the plane of the front wheel 32, i.e. the handlebar 20 is 'folded'.

FIG. 1b shows a cross section of inside tube 1 unlocked from, i.e. rotatable with respect to, outside tube 2. Inside tube 1 is rotatable with respect to outside tube 2 because lock pins 7 have been pushed into an 'unlocked' position, to be further discussed below. In the arrangement shown in FIG. 1b, the handlebar 20 may be rotated while the fork 30 and, thus, the front wheel 32 are not rotated. This is how an arrangement of the handlebar 20 for riding is transformed from or to an arrangement for storage or other arrangement in which it is useful to have the handlebars 20 folded.

Figure 1:
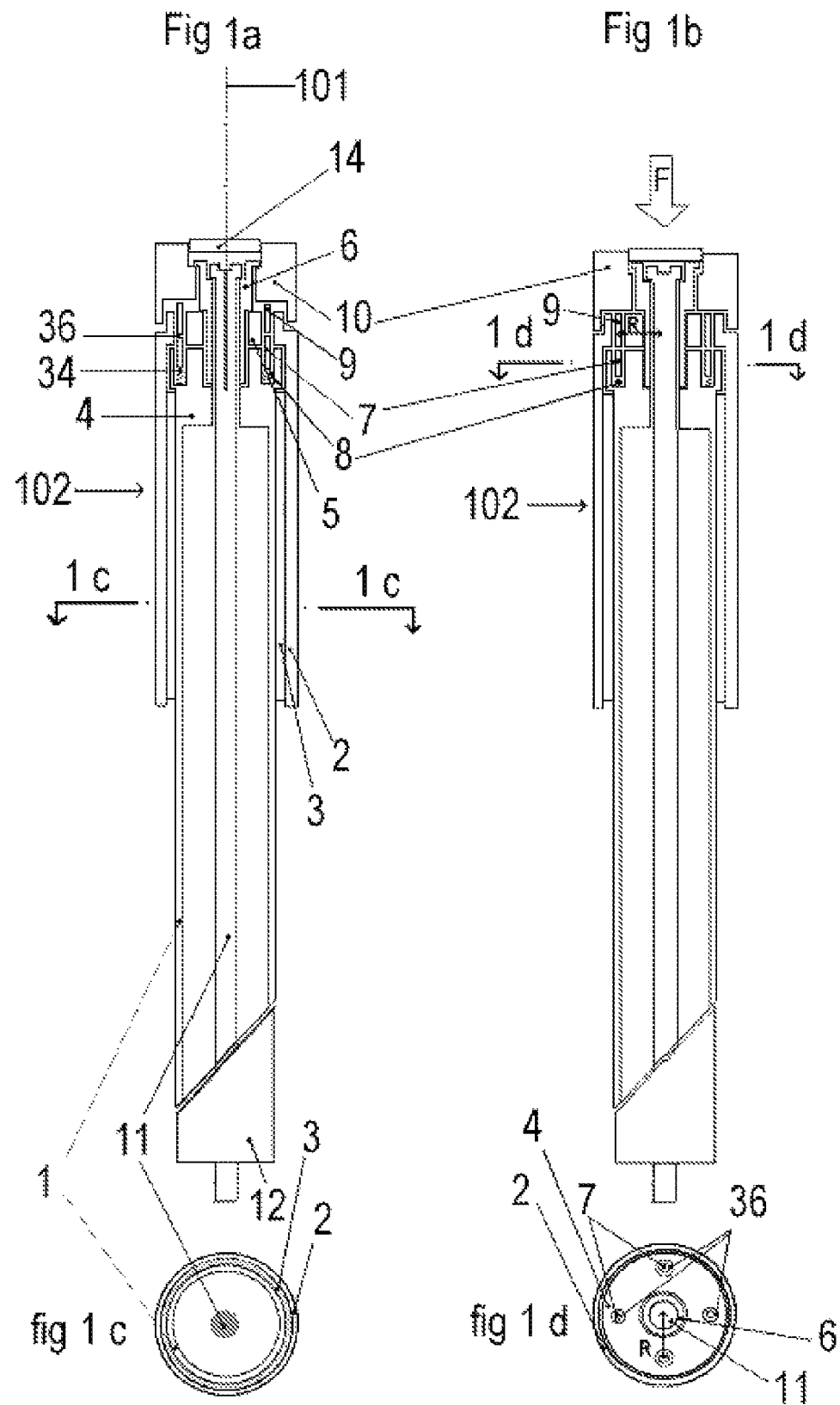

Disposed at the top of inside tube 1 is quill disc 4. Quill disc 4 comprises a group of holes 34 extending into the quill disc 4 parallel to the centerline 101. Centerline 101 defines an axis of both the inside tube 1 and the outside tube 2 in addition to other structural elements of the present invention. Each hole 34 has a center located a distance "R" from the centerline 101. Stem disc 5 is disposed in or is part of outside tube 2. Stem disc 5 also comprises a group of holes 36 extending into stem disc 5 parallel to the centerline 101 and centered a distance "R" from the centerline 101. Disposed between inside tube 1 and outside tube 2 is a bearing element such as a low friction sleeve 3. The low friction sleeve 3 may also be a ball bearing or a needle bearing. Low friction sleeve 3 keeps both tubes 1 and 2 in concentric alignment. Quill disc 4 and stem disc 5 are arranged such that holes 34 and 36 may be caused to line up by rotating inside tube 1 and outside tube 2 with respect to one another. Bushing 6 keeps this arrangement. In the embodiment of FIG. 1 quill disc 4 is located below stem disc 5.

Each of inside tube 1, outside tube 2, bushing 6, quill disc 4 and stem disc 5 have concentric through holes therein. A long anchoring bolt 11 extends through these holes and holds each of these elements together. Bolt 11 also anchors stem 100 to the fork 30 of the bicycle by anchoring nut 12.

Holes 34 and 36 are sized to receive lock pins 7. Springs 8 at the bottom of either holes 34 or 36 and lock pins 7 are adjacent springs 8. Each lock pin 7 is biased by spring 8 to extend a distance beyond the top of the hole in which the spring 8 to which it is attached is located. When holes 34 and 36 are in alignment, the portions of lock pins 7 extending beyond the tops of holes 34 may extend into aligned holes 36.

In FIGS. 1a and 1b, holes 34 are shown having a lock pin 7 and adjacent spring 8. In this arrangement, occupying holes 36 in the stem disc 4 are push pins 9 which push lock pins 7 and compress springs 8 when a particular push pin 9 is aligned with a particular lock pin 7 and button 10 is operated on by force "F", shown in FIG. 1b. Thus, if lock pin 7 is aligned with hole 36 then spring 8 will bias lock pin into hole 36; if no counteractive force is present, e.g. from push pin 9 as a result of force F, then lock pin 7 will be permitted to enter hole 36. The length of lock pin 7 is chosen such that a portion thereof will always be disposed in hole 34. Thus, if lock pin 7 enters hole 36 then it is no longer possible to rotate inside tube 1 with respect to outside tube 2, i.e. the tubes are locked. When force F is exerted on button 10, push pins 9 are caused to transmit this force to lock pins 7 thereby compressing springs 8. Once springs 8 are compressed sufficiently that the tops of lock pins 7 exit completely holes 36, inside tube 1 and outside tube 2 may be rotated with respect to one another.

Thus, lock pins 7 entering holes 36 lock a particular arrangement of handlebar 20 and fork 30 and attached front wheel. It is possible to change this arrangement by applying force F on button 10, which causes push pins 9 to force lock pins 7 out of holes 36, and then turning outside tube 2 with respect to inside tube 1 until a desirable and available lockable arrangement of handlebar 20 and fork 30 is reached, at which point force F is released and springs 8 again force lock pins 7 into holes 36, preventing relative rotation of tubes 1 and 2. Springs 8 comprise the primary bias in the system. However, it is not necessary that springs 8 are the only source of bias. Among other places, more robust biasing elements 24 may contact the top face of quill disc 4 and bottom face of cup 14, as shown in FIG. 9.

A cup 14 on top of the button 10 prevents water from entering into the mechanism.

When stem disc 5 has been rotated with respect to the quill disc 4 such that holes 34 are not aligned with holes 36 the button 10 can be released because the lock pins 7 cannot enter holes 36 and merely slide along the bottom face of stem disc 5. Tubes 1 and 2 are unlocked and will rotate with respect to one another until lock pins 7 are again in alignment with holes 36. If the number of holes 34, 36 in each disc 4, 5 is four and there is an equal angular distance between each successive hole, the mechanism may be locked every 90 degrees.

Figure 2:
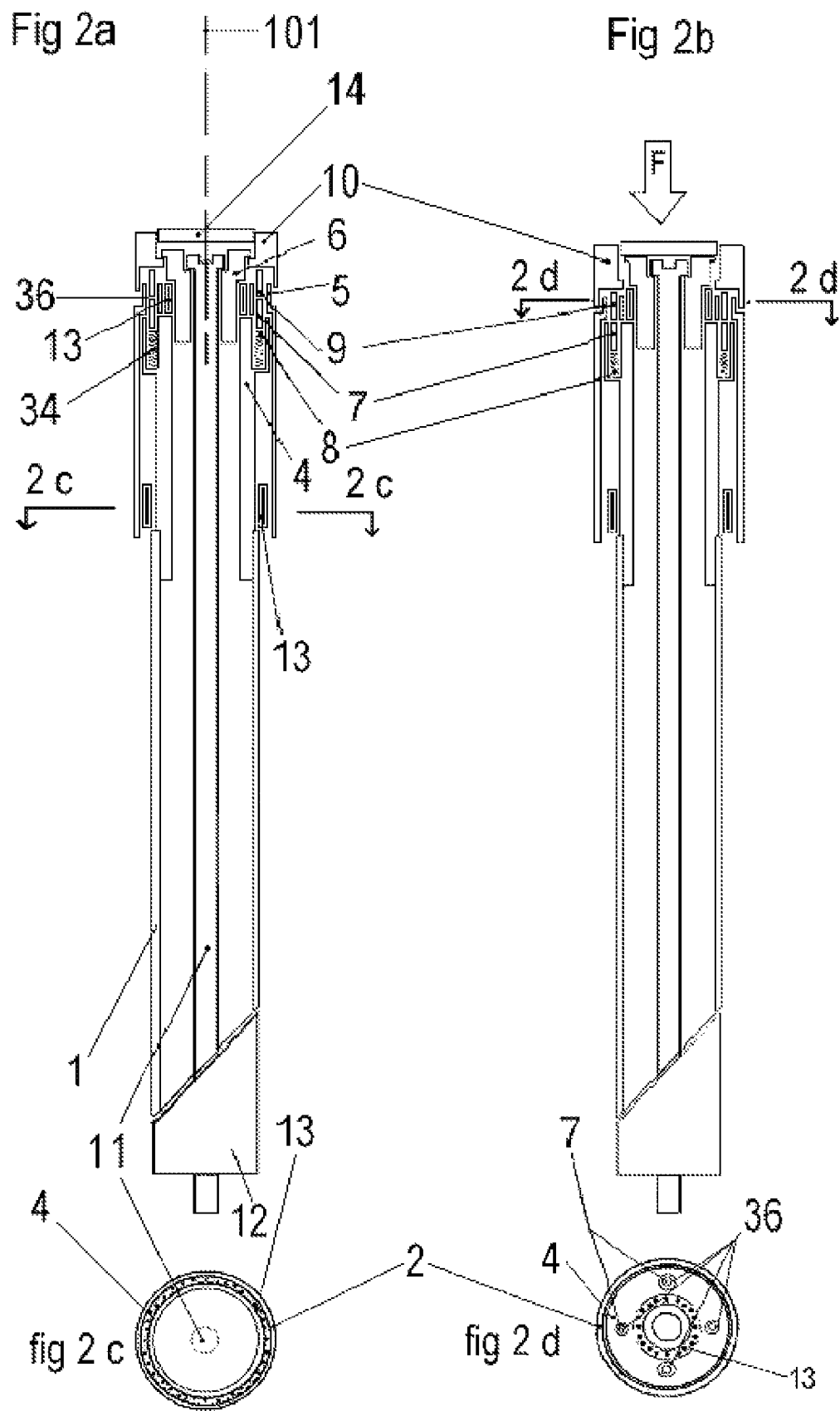
FIGS. 2a-2d are the similar views as FIGS. 1a-1d, but with the stem including a needle bearing instead of low friction sleeve according to another example embodiment of the present invention.

FIG. 2 shows an alternative embodiment where low friction sleeve 3 has been replaced by needle bearings 13, one adjacent the bottom of outside tube 2 and the other one adjacent the stem disc 5 and the bushing 6.

Figure 3:
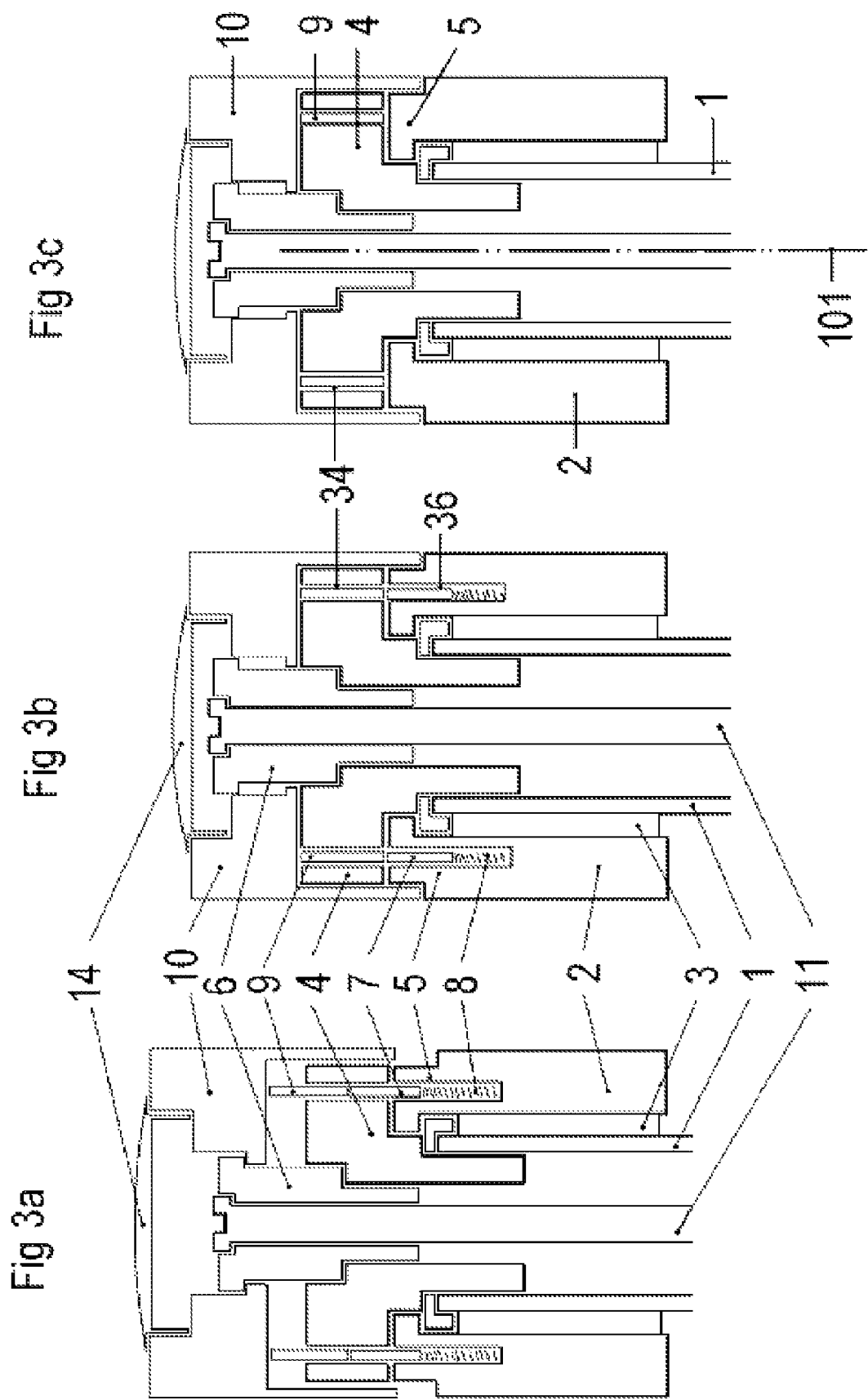
FIGS. 3a-3c are cross section details of the stem according to another example embodiment of the present invention.

FIG. 3a is a detailed cross section showing the lock pins 7 extending into both discs 4 and 5. Thus, FIG. 3a shows a locked arrangement. FIG. 3b shows the same cross section but the button 10 has been pressed down by force F, thus the push pins 9 have pushed down the lock pins 7 compressing the springs 8 and placing the lock pins 7 in the unlocked position ready to be rotate. FIG. 3c shows the same cross section through outside tube 2 but with inside tube 1 rotated slightly; this is possible because tubes 1 and 2 are unlocked from one another. The springs 8 are still biasing the lock pins 7 but the tops of pins 7 abut the bottom surface of quill disc 4, which provides the balancing force to the spring 8 bias.

Figure 4:
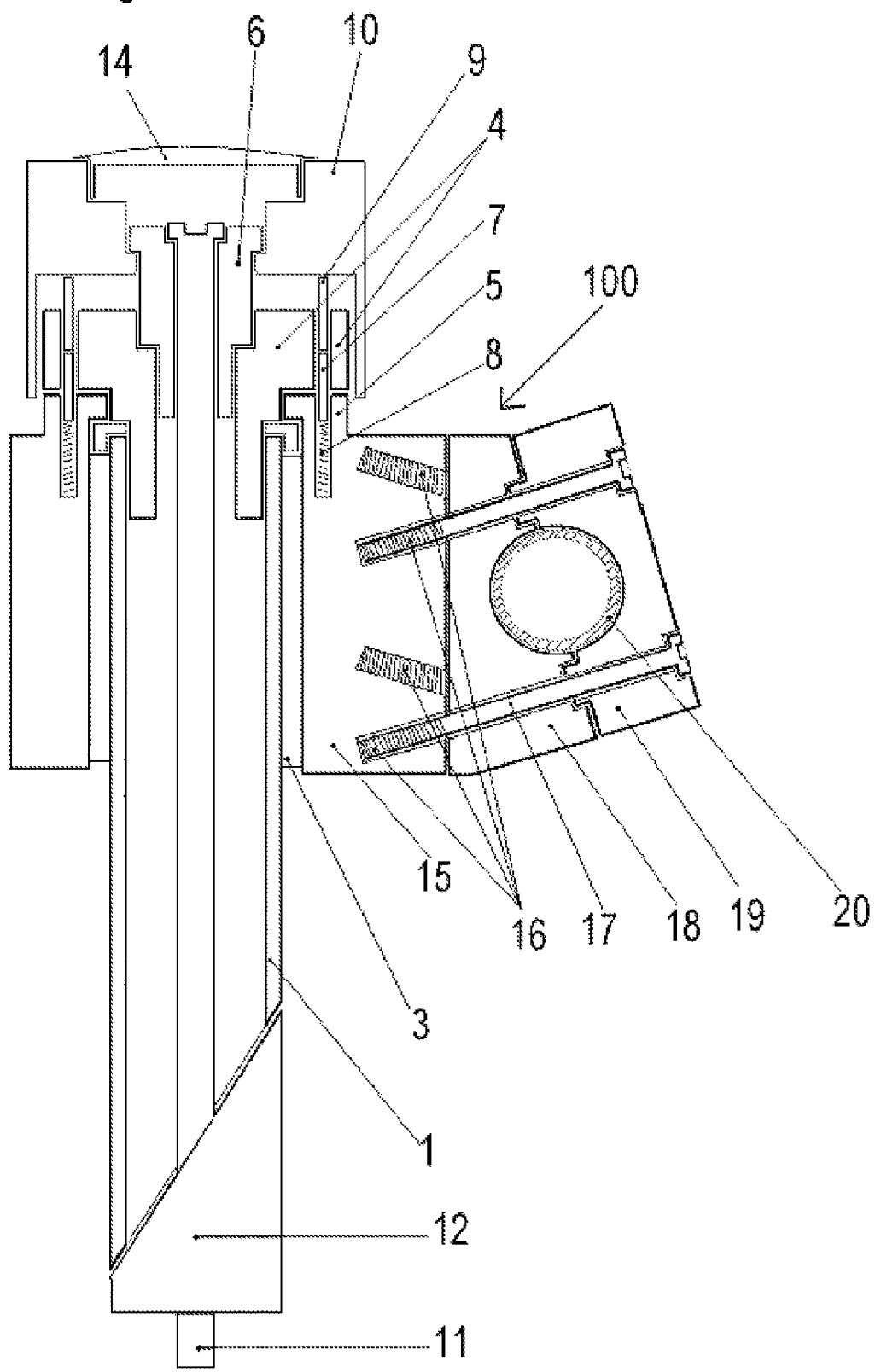
FIG. 4 is a cross sectional plan view of the stem according to another example embodiment of the present invention.
Figure 5:
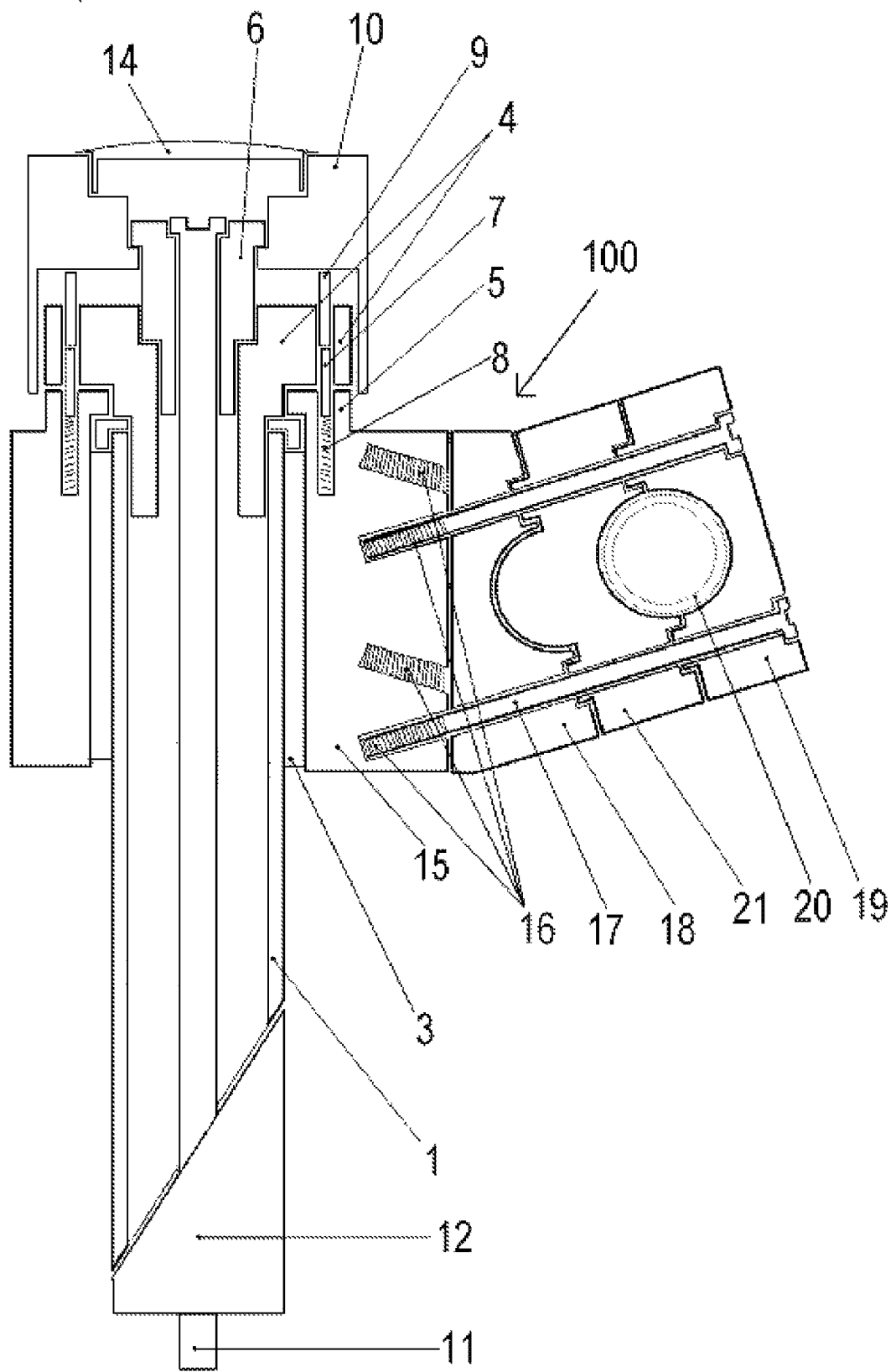
FIG. 5 is a cross sectional plan view of the stem according to another example embodiment of the present invention.
Figure 6:
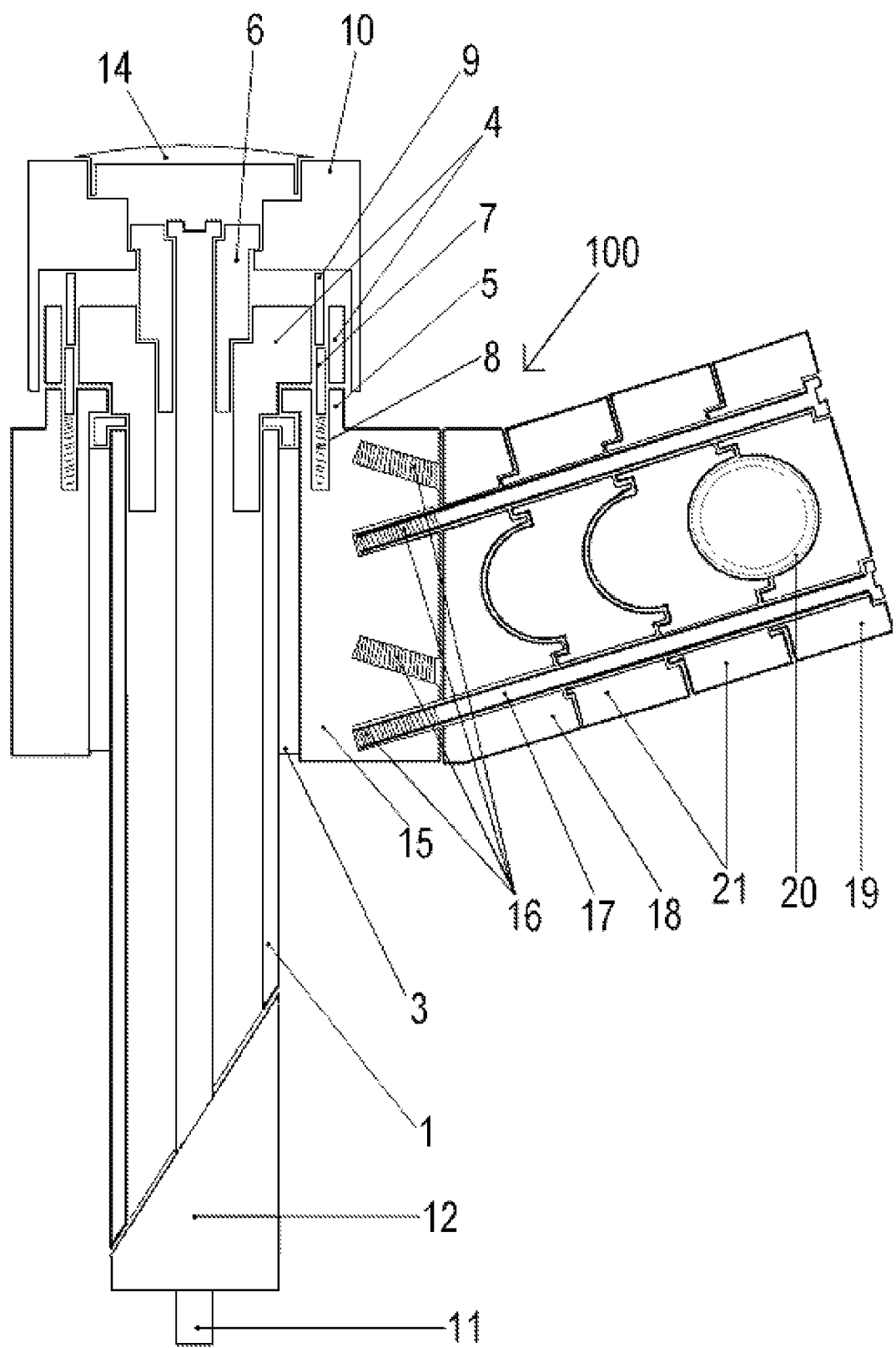
FIG. 6 is a cross sectional plan view of the stem according to another example embodiment of the present invention.

FIG. 4 is an alternative embodiment of the present invention wherein the stem is integral with the quill. Outside tube 2 has attached thereto or formed integrally therewith a stem body 15. The stem body 15 includes a number of threaded holes 16 in which bolts 17 are screwed holding the stem 100 together. Adjustable extension 18 and handlebar holder 19 are part of the stem 100. The handlebar 20 is firmly held between the adjustable extension 18 and the handle bar holder 19. Handlebar 20 is removable and adjustable by means of bolts 17. FIG. 5 shows the same stem as FIG. 4 in which an additional extension 21 has been placed in order to elongate the stem 100, i.e. increase the distance between outside tube 2 and handlebar 20. FIG. 6 is the same as FIG. 5 but with two additional extensions 21 instead of one, showing that is possible to add as many additional extensions 21 as necessary.

FIG. 7 shows the stem with one additional extension 21 but in this case the stem 100 is pointing down. This is possible through rotation of the adjustable extension 18 by 180° and attachment of adjustable extension 18 against the stem body 15 using the same bolts 17 on the other set of threaded perforations 16.

FIG. 8a is another alternative embodiment of the invention. The quill disc 4 is above the stem disc 5. This cross section shows the mechanism locked. FIG. 8b shows button 10 pushed down, thus unlocking the mechanism and allowing inside tube 1 to rotate with respect to outside tube 2. Quill disc 4, stem disc 5, lock pins 7, push pins 9, springs 8, quill disc holes 34 and stem disc holes 36 operate in this alternative embodiment is the same way as described previously to lock inside tube 1 and outside tube 2.

Figures 9A, 9B, 9C:
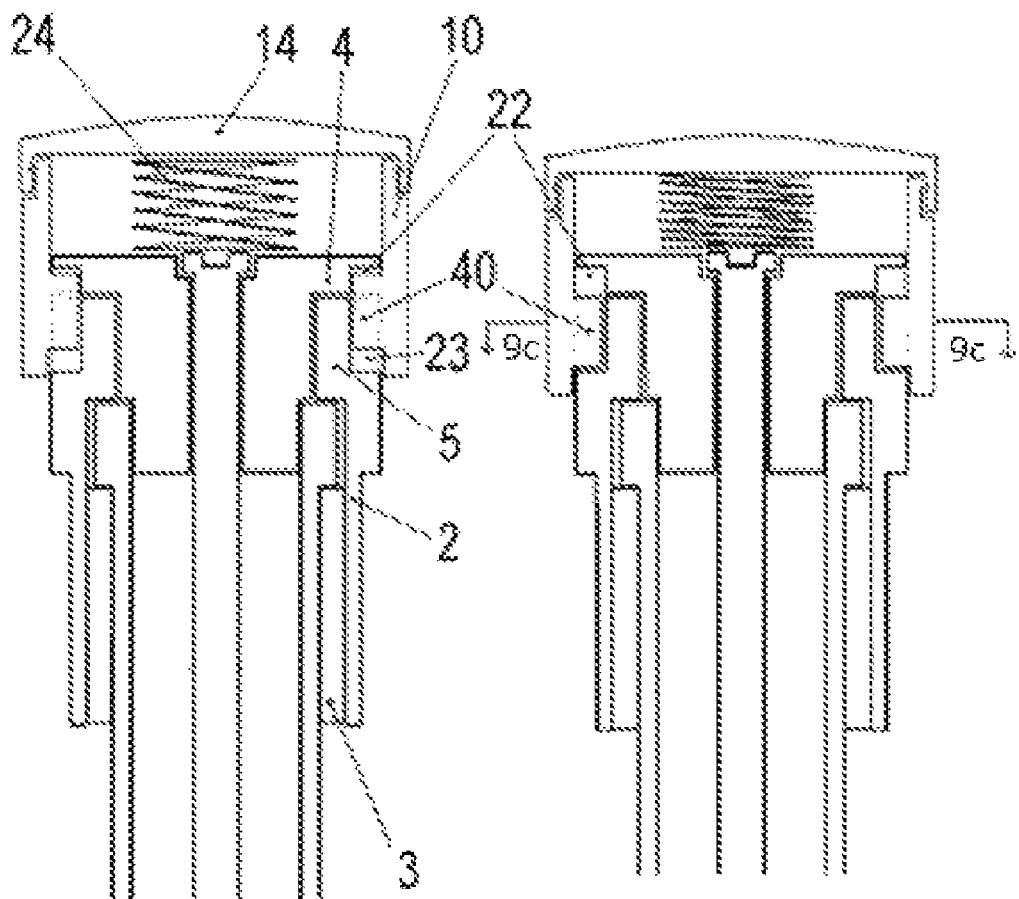
FIG. 9a is a cross sectional plan view of the stem in a locked arrangement according to another example embodiment of the present invention.
FIG. 9b is a cross sectional detail of the stem of FIG. 9a in an unlocked arrangement.
FIG. 9c is a cross sectional plan view taken along section line 9c of FIG. 9b.

FIG. 9a shows an alternative embodiment in accordance with the present invention. The locking tabs 40 are integral with or attached to button 10. The locking tabs 40 shown in FIG. 9 are keyed to quill disc slots 22, and stem disc slots 23 formed in the peripheral edge of both the stem disc 5 and the quill disc 4. FIG. 9a is a cross section showing the locked configuration. Locking tabs 40 are keyed to and extend into both quill disc slots 22 and stem disc slots 23, thus preventing relative rotation of inside tube 1 and outside tube 2. FIG. 9b is a detailed cross section showing the unlocked configuration. Pushing button 10 overcomes the force of biasing element 24, e.g. a spring, and causes button 10 to move axially toward outside tube 2 until locking tabs 40 are no longer inside quill disc slots 22. When locking tabs 40 are no longer inside quill disc slots 22, inside tube 1 may be rotated with respect to outside tube 2. Four slots in quill disc 4 and four slots in stem disc 5, set 90° apart, affords four locking positions. As with the alternative embodiment of FIG. 8, the quill disc 4 and stem disc 5 may be inverted in the embodiment of FIG. 9 and the locking tabs 40 may be associated with either the inside tube 1 and outside tube 2. FIG. 9c is a top section of the quill showing the four locking tabs 40 inside the four stem disc slots 23.

Figure 10:
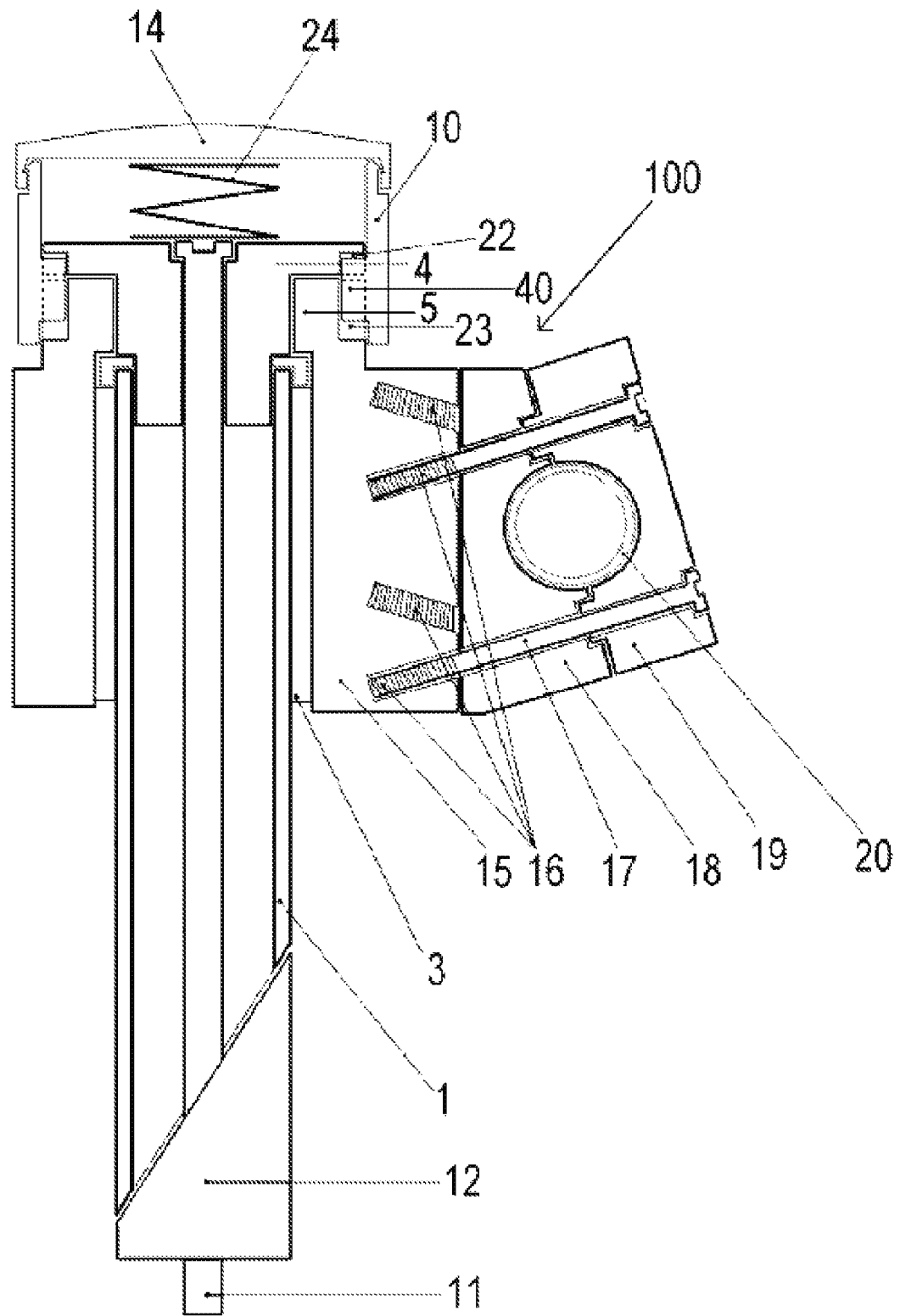
FIG. 10 is a cross sectional plan view of several combined alternate embodiments of the present invention.

FIG. 10 is the same embodiment as FIGS. 4, 5 and 6 with a locking mechanism like that of FIG. 9. The system is locked because locking tabs 40 are partially inside quill disc slots 22 and partially inside stem disc slots 23. Stem disc 5 is part of stem body 15. An extended biasing element 24 between the top face of the quill disc 4 and cup 14 keeps the button up and the mechanism locked.

FIGS. 13a-13f illustrate an alternate embodiment of the adjustable quill in accordance with the present invention. Stem 100 may include a stem body 15, a vertical oriented hole having an inner surface defining an outside tube 2 at one end for connection with quill 102, and a handlebar holder 19 at the other end for connection to handlebar 20. Quill 102 is oriented generally vertically and includes an upper end defining an inside tube 1 which is disposed within outside tube 2 of stem 100. The lower end of the quill 102 is connected to steering fork 30, which in turn is connected to front wheel 32 of the bicycle. The quill 102 may be attached to the fork 32 by different anchoring systems depending on the fork of the particular model of bicycle. For example, the anchoring systems may include an anchoring bolt 11 disposed within a through bore through the quill 102 and which is tightened from the top with a key.

Inside tube 1 of quill 102 and outside tube 2 of stem 100 may be locked together in a locked condition or allowed to rotate with respect to one another in a free swivel condition. In the locked condition, the inside tube 1 may be locked to the outside tube 2 such that the handlebar and front wheel turn together. The inside and outside tubes 1 and 2 may be locked together in one or more positions, for example, a driving position where the handlebar 20 is generally perpendicular to the plane of the front wheel 32 and a folded storage position where the handlebar is generally parallel to the plane of the front wheel 32. In the free swivel condition, the inside tube 1 of quill 102 may rotate with respect to outside tube 2 of stem 100 to allow for unrestricted rotation of handlebar 20 with respect to front wheel 32.

Figure 13A:
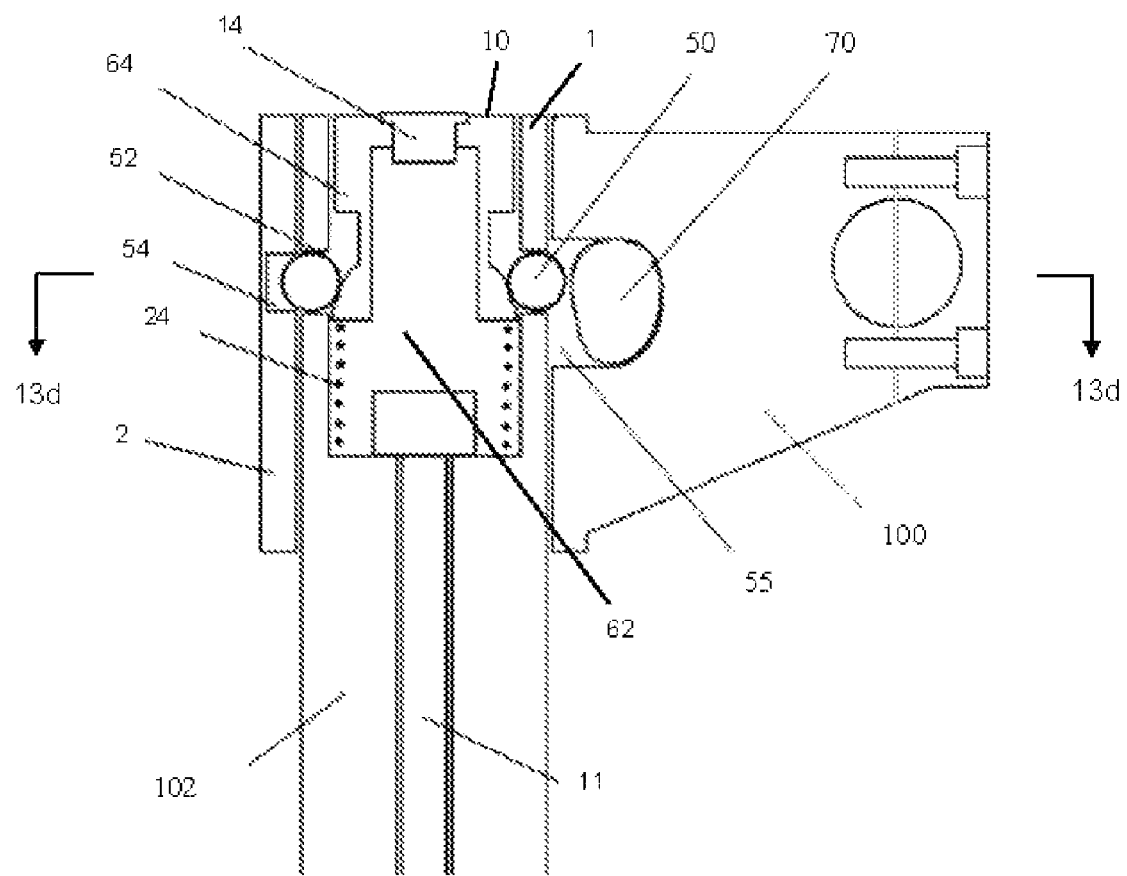
FIG. 13a is a cross sectional plan view of the stem according to another example embodiment of the present invention in a locked arrangement.
Figure 13D:
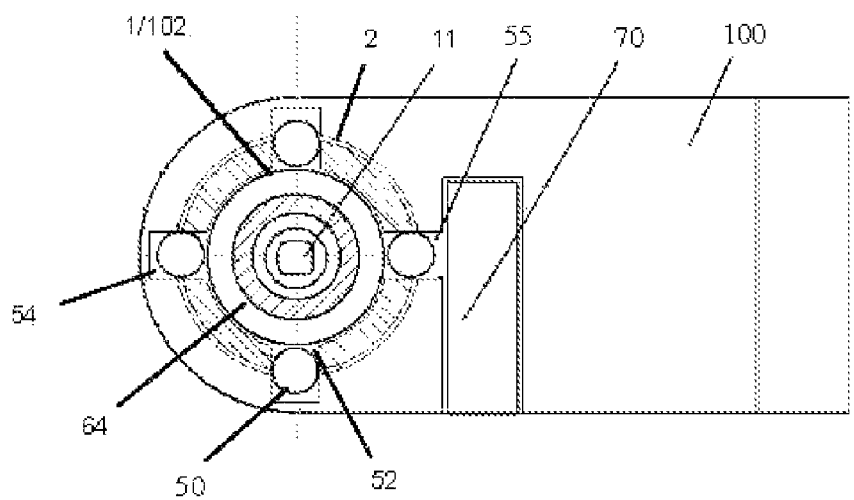
Figure 13B:
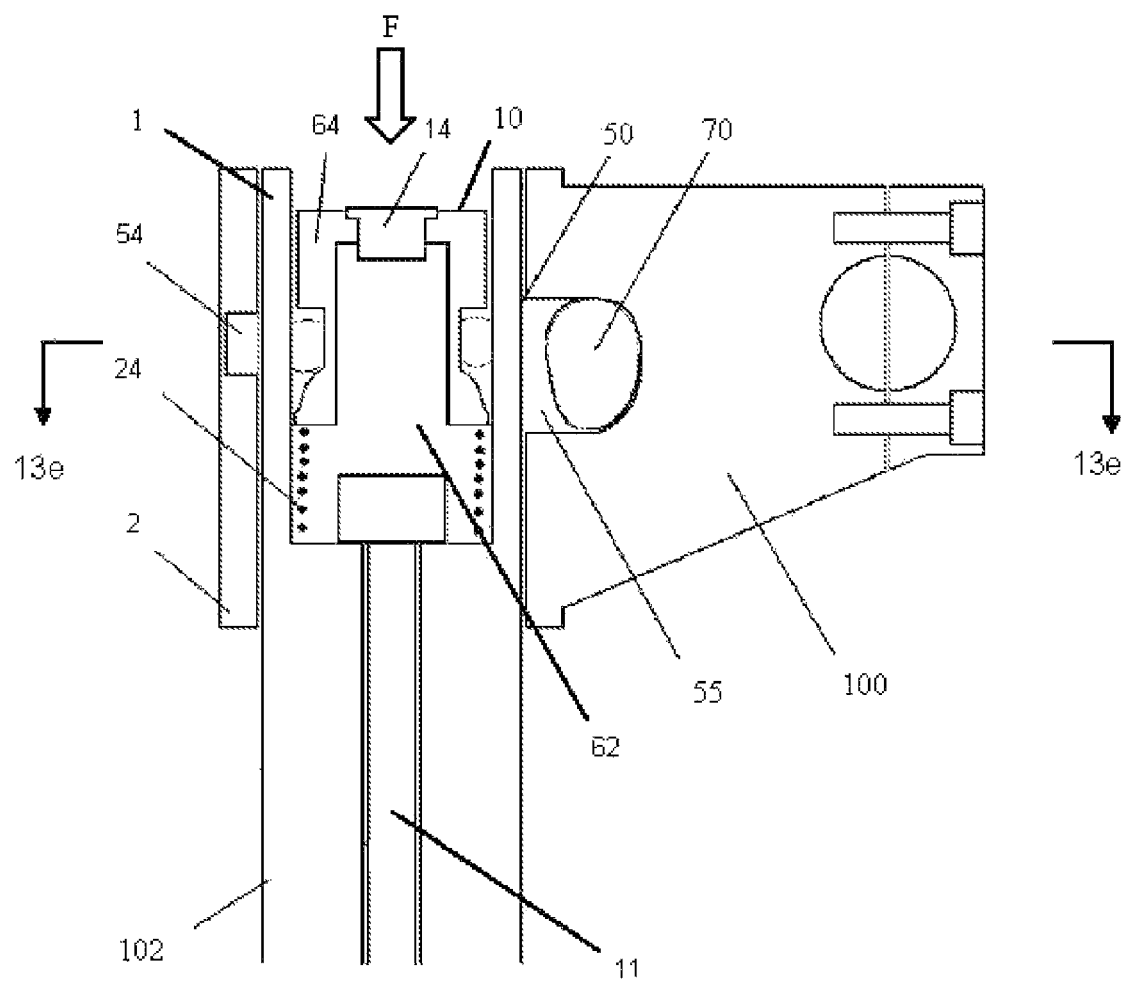
FIG. 13b is cross sectional plan view of the stem of FIG. 13a in an unlocked arrangement.
Figure 13E:
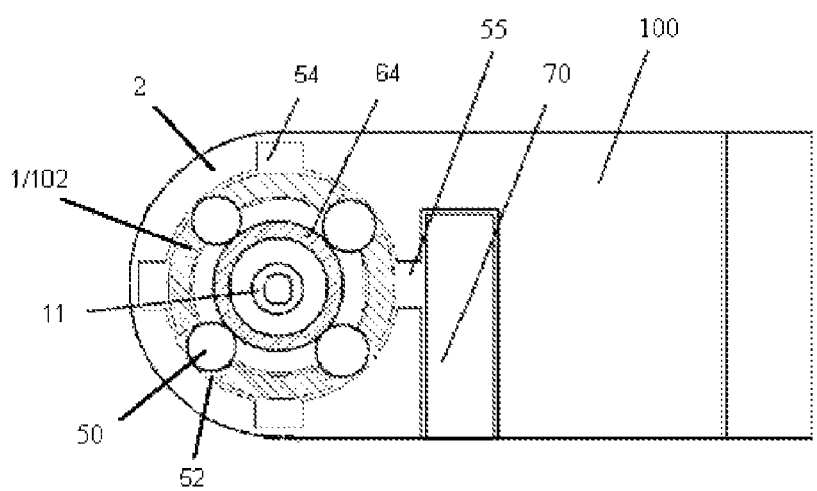
FIG. 13e cross sectional plan view taken along line 13e of FIG. 13b.

FIG. 13a shows a cross section of inside tube 1 of quill 102 in locked condition with respect to outside tube 2 of stem 100, while FIG. 13b shows a cross section of the inside tube of quill 102 and outside tube 2 of stem 100 in a free swivel condition. FIG. 13d shows a cross section along line D-D of FIG. 13a, and FIG. 13e shows a cross section along line E-E of FIG. 13b. As shown, one or more quill holes or apertures 52 are radially defined at the upper end of inside tube 1. A locking element, such as ball 50, is contained within each quill aperture 52. One or more stem cavities or pockets 54 are radially disposed along the inner surface of outside tube 2 in correspondence with the quill apertures 52 of the inside tube 1. One or more of the stem cavities 54 may be open to a locking mechanism 70 located within the stem 100, and is referred to as locking cavity 55.

Stem cavities 54 may be located at one or more locking positions for the handlebar 20 at which the inside and outside tubes 1 and 2 can be locked together. For example, as shown, there are four stem cavities 54 located at increments of about 90° in locking positions that correspond to various driving and storage positions for the handlebar 20. The number of quill apertures 52 and balls 50 may be the same as the number of stem cavities 54, however the number of quill apertures 52 and balls 50 may be more or less than the number of stem cavities 54. For example, there may be four stem cavities 54 and one each of the quill aperture 52 and ball 50. However, it is intended that any number of stem cavities 54, quill apertures 52, and balls 50 may be utilized and may correspond to any number of locking positions.

At the upper end of inside tube 1 is a bore hole 62 oriented along the centerline 101 of quill 102. Disposed within the bore hole 62 is a cam 64 that can move vertically along the centerline 101 within the bore hole 62. The cam 64 may have a profile in which a lower section of the cam has a diameter that is greater than an upper section of the cam. A biasing element 24, such as a spring, for example, is disposed between the cam 64 and a bottom wall of the bore hole 62, which is biased to exert an upwards force on the cam 64. A button 10 may be disposed above the cam 64 that is operable by exertion of force F to act on the cam 64.

In operation, the spring 24 biases the cam 64 upward so that the greater diameter lower section of the cam 64 contacts balls 50, thereby forces the balls 50 radially outward. When quill apertures 52 of the inside tube 1 are aligned with the cavities 54 of the outside tube 2, the balls 50 are pushed through the quill apertures 52 such that the balls 50 protrude at least partially within the stem cavities 54 in the outside tube 2 and at least partially within the quill apertures 52 of inside tube 1. This locks the outside tube 2 to the inside tube 1 and prevents stem 100 from rotating around quill 102. When force F is exerted on the button 10, the cam 64 is forced downward such that the greater diameter lower section of the cam 64 loses contact with balls 50, thereby allowing the balls 50 to move radially inward. When the balls 50 are extracted from of the stem cavities 54 of the outside tube 2, the stem 100 is able to rotate around the quill 102 in a free swivel condition. The inside and outside tubes 1 and 2 may remain in a free swivel condition until force F is removed from button 10 and the stem 100 is rotated such that the quill apertures 52 of the inside tube 1 are aligned with the stem cavities 54 of the outside tube at the next position, which allows the balls to protrude at least partially into the stem cavities 54. For example, the stem 100 may be rotated 90° to the next locking position.

Figure 13C:
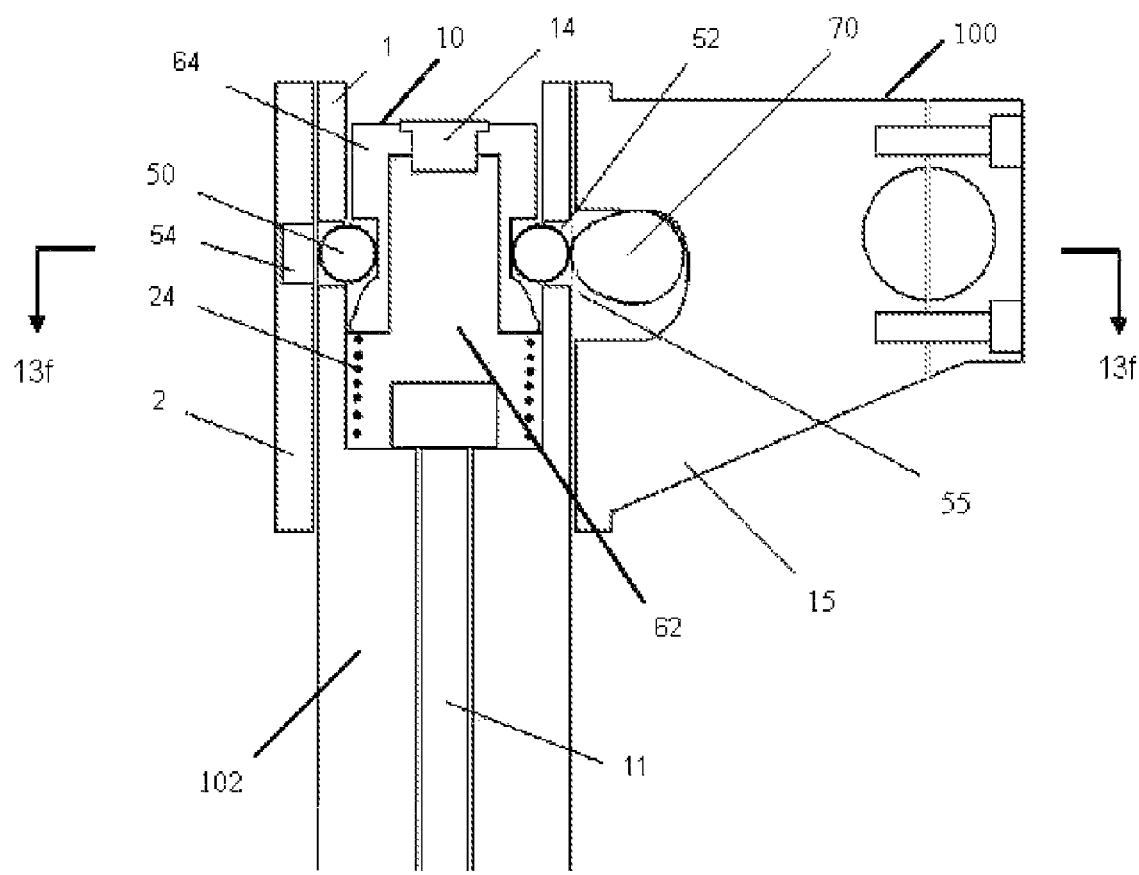
FIG. 13c cross sectional plan view of the stem of 13b in which an additional locking mechanism is in activated arrangement.
Figure 13F:
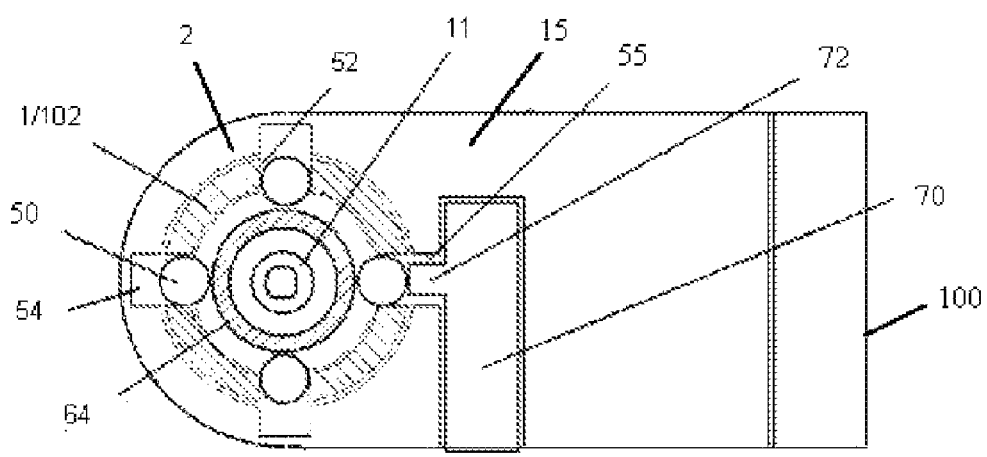
FIG. 13f cross sectional plan view taken along line 13f of FIG. 13c.

FIG. 13c is a cross section showing an additional locking mechanism 70 that is activated to maintain stem 100 and quill 102 in the free swivel condition to preclude the handlebar 20 and front wheel 32 from acting in concert. FIG. 13f shows a cross section along line F-F of FIG. 13c. The locking mechanism is deactivated in FIGS. 13a-b and 13d-e. The additional locking mechanism 70 may prevent the bicycle from being driven to guard against theft.

The locking mechanism 70 may comprise a locking cam 72 rotatably disposed within the stem body 15 of stem 100. The locking mechanism 70 maybe activated or deactivated, such as by turning a key. When the key is turned, the locking cam 72 is rotated to obstruct the locking cavity 55 in outside tube 2 so as to prevent the ball 50 from entering the locking cavity 55. The obstructed ball 50 remains contained within quill apertures 52 in the inside tube 1 and protrudes at least partially inward into bore hole 62 of the inside tube 1. The protruding ball 50 prohibits the upward movement of the cam 64, thus maintaining the quill 102 in the free swivel condition. To deactivate the locking mechanism 70, the key is turned to rotate the locking cam 72 so that the locking cavity 55 is unblocked, thereby allowing the ball 50 to freely enter the locking cavity 55 and the cam 64 to move upward so that the quill 102 can return to a locked condition.

Now that exemplary embodiments of the present invention have been shown and described in detail for purposes of clarity and understanding, various modifications and improvements thereon will become readily apparent to those skilled in the art. Accordingly, the spirit and scope of the present invention is to be construed broadly and limited only by the appended claims, and not by the foregoing specification.

What is claimed is:
1. A cycle stem comprising:

a quill having first end including an attachment for connecting to a wheel fork of a cycle and a second end defining an inside tube, the quill including one or more radially oriented apertures disposed around the inside tube at the second end of the quill;

a stem having a body, a first end including an attachment for connecting to a handlebar of a cycle, a second end including an hole in which an inner surface of the hole defines an outside tube coaxially disposed about the inside tube for rotation therebetween, the stem including one or more radially oriented cavities disposed on the inner surface of the outside tube corresponding to the one or more apertures of the quill;

one or more locking elements disposed in at least one of an unlocked and a locked position, wherein in the locked position each of the locking elements are disposed at least partially within an aperture of the quill and a cavity of the stem so as to lock the stem to the quill to prevent relative rotation therebetween, wherein in the unlocked position each of the locking elements are disposed in one of an aperture of the quill and a cavity of the stem to allow the stem to rotate in a free swivel condition with respect to the quill; and a cam slidably disposed within the inside tube at the second end of the quill, the cam having a first position forcing the locking elements to move radially into the locked position and a second position allowing the locking elements to move radially to the unlocked position.

2. The cycle stem of claim 1, wherein the locking elements move between the locked position and the unlocked position when the apertures of the quill are aligned with the cavities of the stem.

3. The cycle stem of claim 1, further comprising a biasing element applying a biasing force on the cam locking toward the first position, thereby biasing the locking elements toward the locked position.

4. The cycle stem of claim 3, wherein the cam moves toward the second position when a force is applied to the cam to overcome the biasing force of the biasing element, thereby allowing the locking elements to move to the unlocked position.

5. The cycle stem of claim 1, wherein the cam pushes the locking elements radially outward toward the locked position when the cam is in the first position and the cam allows the locking elements to move radially inward toward the unlocked position when the cam moves toward the second position.

6. The cycle stem of claim 1, wherein the locking elements are located at positions corresponding to one or more locking positions for the handlebar of the cycle.

7. The cycle stem of claim 1, wherein four locking elements are located at positions spaced apart by about 90 degree increments.

8. The cycle stem of claim 1, wherein the cam has a lower section having a greater outer diameter than an upper section of the cam.

9. The cycle stem of claim 1, further comprising a secondary lock that is lockable to maintain the stem in free swivel condition with respect to the quill.

10. The cycle stem of claim 9, wherein the secondary lock comprises a locking cam disposed with the body of the stem which is rotatable to obstruct a locking element from entering the cavity in the stem.

11. The cycle stem of claim 10, wherein the obstructed locking element protrudes radially inward so as to prevent the cam from returning to the first position.

* * * * *